United States Patent
Kobayashi (10) Patent No.: US 7,317,678 B2
(45) Date of Patent: Jan. 8, 2008

(54) OPTICAL DISC, OPTICAL DISC RECORDING/REPRODUCING APPARATUS, AND OPTICAL DISC RECORDING/REPRODUCING METHOD

(75) Inventor: Tadashi Kobayashi, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 11/448,796

(22) Filed: Jun. 8, 2006

(65) Prior Publication Data
US 2006/0227698 A1    Oct. 12, 2006

Related U.S. Application Data

(62) Division of application No. 10/205,499, filed on Jul. 26, 2002, now Pat. No. 7,088,667.

(30) Foreign Application Priority Data
Jul. 27, 2001    (JP)    ............................. 2001-228344

(51) Int. Cl.
*G11B 7/24*    (2006.01)
*G11B 5/09*    (2006.01)

(52) U.S. Cl. ............... 369/275.3; 369/47.5; 369/47.28; 369/47.46

(58) Field of Classification Search .................... None
See application file for complete search history.

(56) References Cited

U.S. PATENT DOCUMENTS

| 5,835,462 A | 11/1998 | Mimnagh |
| 6,580,684 B2 | 6/2003 | Miyake et al. |

FOREIGN PATENT DOCUMENTS

| CN | 1182497 A | 5/1998 |
| JP | 05-144004 | 6/1993 |
| JP | 07-093754 | 4/1995 |
| JP | 09-16964 | 1/1997 |
| JP | 11-513521 | 11/1999 |
| JP | 2000-113458 | 4/2000 |
| JP | 2000-163751 | 6/2000 |

*Primary Examiner*—Muhammad Edun
(74) *Attorney, Agent, or Firm*—Pillsbury Winthrop Shaw Pittman, LLP (57) ABSTRACT

In an optical disc in/from which data is recorded or reproduced by irradiating a storage area on the optical disc with a laser, information containing recording velocity information (RVI) for recording/reproduction, which represents a linear velocity different from the standard linear velocity, and write strategy information (WSI) corresponding to the recording velocity information is stored in a land pre-pit or the like on the optical disc.

4 Claims, 10 Drawing Sheets

Write strategy information (WSI)

| WSI Code | Write strategy type |
|---|---|
| 00h | Type 00 |
| 01h | Type 01 |
| 02h | Type 02 |
| 03h | Type 03 |
| 04h | Type 04 |
| 05h | Type 05 |
| 06h | Type 06 |
| 07h | Type 07 |
| -- | -- |

| Pre-pit data frame number | Bit position | | |
|---|---|---|---|
| | 0 | 1 to 4 | 5 (MSB) to 12 (LSB) |
| 0 | SYNC* | 0000b | Part A |
| 1 | | 0001b | 1-byte disc information |
| 2 | | 0010b | 1-byte disc information |
| 3 | | 0011b | 1-byte disc information |
| 4 | | 0100b | 1-byte disc information |
| 5 | | 0101b | 1-byte disc information |
| 6 | | 0110b | 1-byte disc information |
| 7 | | 0111b | 1-byte disc information |
| 8 | | 1000b | Part B |
| 9 | | 1001b | 1-byte disc information |
| 10 | | 1010b | 1-byte disc information |
| 11 | | 1011b | 1-byte disc information |
| 12 | | 1100b | 1-byte disc information |
| 13 | | 1101b | 1-byte disc information |
| 14 | | 1110b | 1-byte disc information |
| 15 | | 1111b | 1-byte disc information |

Recorder write strategy information (D-WSI)

| D-WSI Code | Write strategy type |
|---|---|
| 10h | Type 10 |
| 11h | Type 11 |
| 12h | Type 12 |
| 13h | Type 13 |
| 14h | Type 14 |
| 15h | Type 15 |
| 16h | Type 16 |
| 17h | Type 17 |
| — — | — — |

OPTICAL DISC, OPTICAL DISC RECORDING/REPRODUCING APPARATUS, AND OPTICAL DISC RECORDING/REPRODUCING METHOD

CROSS-REFERENCE TO RELATED APPLICATIONS

This application is a divisional of U.S. application Ser. No. 10/205,499, filed Jul. 26, 2002 now U.S. Pat. No. 7,088,667, and for which priority is claimed under 35 U.S.C. §121. This application is based upon and claims the benefit of priority under 35 U.S.C. § 119 from the prior Japanese Patent Application No. 2001-228344, filed Jul. 27, 2001, the entire contents of both applications are incorporated herein by reference in their entireties.

BACKGROUND OF THE INVENTION

1. Field of the Invention

The present invention relates to an optical disc such as a DVD-R (Digital Versatile Disc Recordable), DVD-RW (Digital Versatile Disc Rerecordable), or DVD-RAM (Digital Versatile Disc Random Access Memory), an optical disc recording/reproducing method, and an optical disc recording/reproducing apparatus.

2. Description of the Related Art

Conventionally, a recording linear velocity in recording information on an optical disc such as a DVD is defined at a predetermined value. For example, the recording linear velocity for a DVD-R or DVD-RW is defined at 3.49 m/s by a standard book (DVD-R BOOK or DVD-RW BOOK). Recording at a higher linear velocity is not presumed.

However, a method of recording information at a different recording linear velocity has been proposed as a prior art. In Jpn. Pat. Appln. KOKAI Publication No. 2000-113458, information representing that a given disc is capable of recording at a velocity different from the standard recording linear velocity (3.49 m/s) is stored in that disc. An optical disc recording/reproducing apparatus can record data at a recording linear velocity such as a ×2 or ×4 read rate by reading that information. Hence, data recording processing can be executed not only at the standard linear velocity but also at a linear velocity such as a ×2 read rate in accordance with the velocity given by the optical disc.

In this prior-art apparatus, however, information such as a write strategy or recording power in recording at a velocity other than the standard linear velocity cannot be given by an optical disc. Hence, an appropriate write strategy and the like corresponding to a desired linear velocity must be prepared on the optical disc recording apparatus side, or the user must arbitrarily check and give appropriate values. If the optical disc recording apparatus or the user has no know-how about such information, recording at a recording linear velocity other than the standard velocity cannot be appropriately performed.

BRIEF SUMMARY OF THE INVENTION

It is an object of the present invention to provide an optical disc, optical disc recording/reproducing apparatus, and optical disc recording/reproducing method which make it possible to smoothly perform recording processing at a velocity other than the standard linear velocity by storing in advance possible recording linear velocity information and write strategy information corresponding to the recording linear velocity in predetermined areas of an optical disc such as a DVD-R or DVD-RW.

According to the present invention, there is provided an optical disc which records or reproduces data by irradiating a storage area on the optical disc with a laser, characterized in that at least two sets of information containing recording velocity information for recording/reproduction, which represents a linear velocity different from a standard linear velocity, and write strategy information corresponding to the recording velocity information are stored in a land pre-pit as physical information of the optical disc.

In the present invention with the above arrangement, recording velocity information and write strategy information corresponding to the recording velocity information are stored in the optical disc in advance. Even when the user or optical disc recording apparatus side cannot prepare any appropriate write strategy, appropriate write strategy information corresponding to the selected recording linear velocity can be decided. Hence, an optical disc capable of reliably executing recording processing not only at the standard linear velocity but also at a ×2 read rate, ×3 read rate, ½ read rate, or the like can be provided.

According to the present invention, there is also provided an optical disc recording apparatus which irradiates a storage area on an optical disc with a laser to record predetermined data, characterized by comprising detection means for rotating an optical disc at a predetermined rotational speed, irradiating the optical disc with a laser, and detecting information containing recording velocity information for recording/reproduction, which represents a linear velocity different from a standard linear velocity, and write strategy information corresponding to the recording velocity information, the pieces of information being stored in a predetermined area on the optical disc, decision means for deciding recording velocity information on the basis of the recording velocity information detected by the detection means and deciding the write strategy information corresponding to the recording velocity information as a write strategy to be used, and recording means for generating the laser in accordance with information to be recorded and irradiating a storage area on the optical disc with the laser to record the recording information on the basis of the recording linear velocity and write strategy decided by the decision means.

The present invention provides an optical disc recording apparatus for executing recording processing on the above-described optical disc in which the recording velocity information (RVI) and write strategy information corresponding to the recording velocity information are stored. The recording velocity information RVI and write strategy information WSI stored in the optical disc in advance are read, and an appropriate one of possible recording linear velocities is decided in accordance with an instruction input by the user through, e.g., an operation panel. A write strategy adapted to the decided recording linear velocity is decided from the detected write strategy information. Recording information is recorded on the basis of these pieces of information. Even when no appropriate strategy information can be prepared on the user side or in the optical disc recording apparatus, an optimum write strategy can be automatically adapted. Hence, recording information can reliably be recorded at a data transfer rate desired by the user (a data transfer rate corresponding to the recording linear velocity).

DETAILED DESCRIPTION OF THE INVENTION

An optical disc and optical disc recording/reproducing apparatus according to the present invention will be described below in detail with reference to the accompanying drawing.

First Embodiment

The first embodiment provides an optical disc which prepares, as information stored in that optical disc in advance, code information (recording velocity information (RVI)) that defines recording/reproducing velocities with which the disc copes and disc recommended write strategy information (write strategy information (WSI)) corresponding to linear velocities) corresponding to the recording velocity information. As will be described later, the RVI need not always be code information and may be a defined flag or numerical data. Write strategy information means a recording power or signal waveform width.

Figure 1A:
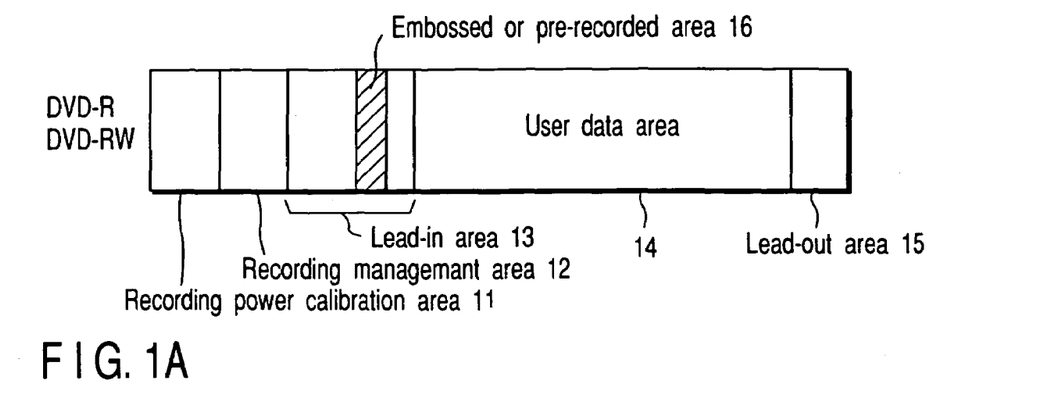
FIG. 1A is a view showing the structure of data recorded in groove tracks of an optical disc (DVD-R or DVD-RW) according to the present invention.
Figure 1B:
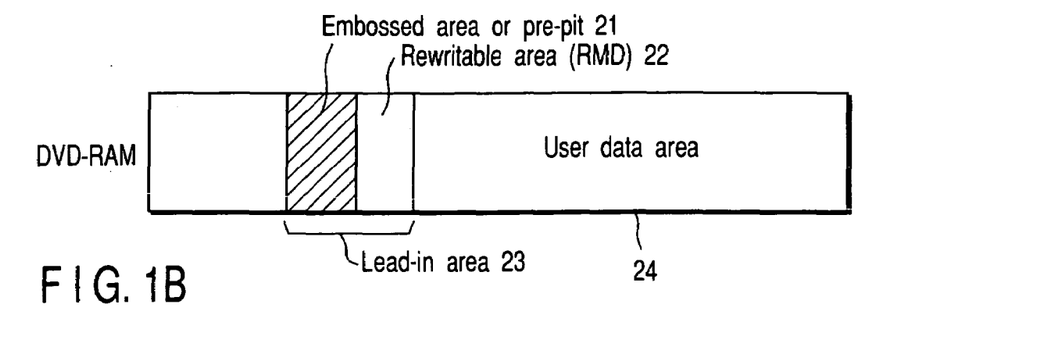
FIG. 1B is a view showing the structure of data recorded in groove tracks of an optical disc (DVD-RAM) according to the present invention.
Figure 2:
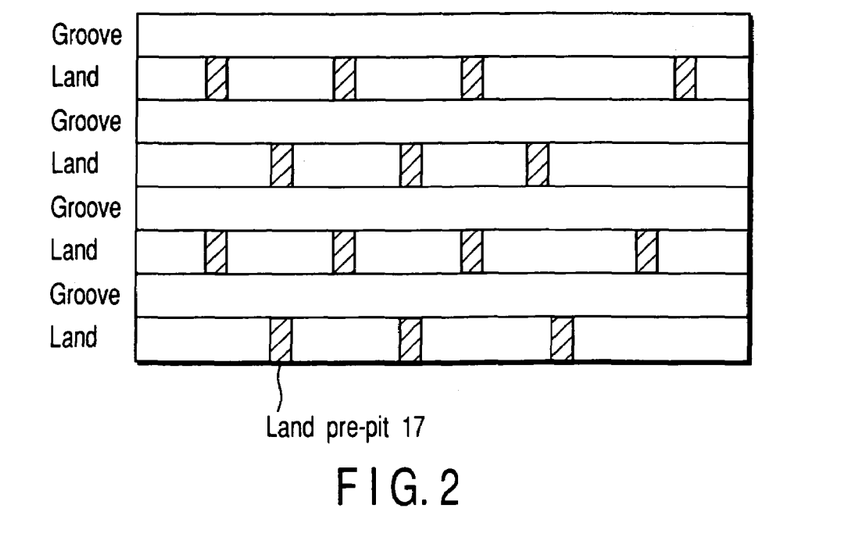
FIG. 2 is a view for explaining land pre-pits of the optical disc according to the present invention.
Figure 3:
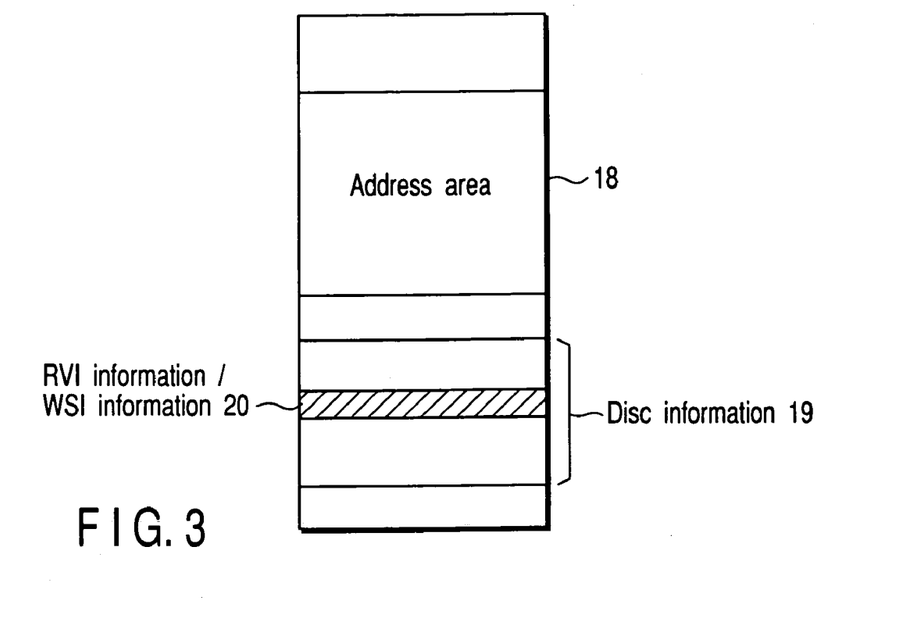
FIG. 3 is a view showing the structure of land pre-pit information of the optical disc according to the present invention.
Figure 4:
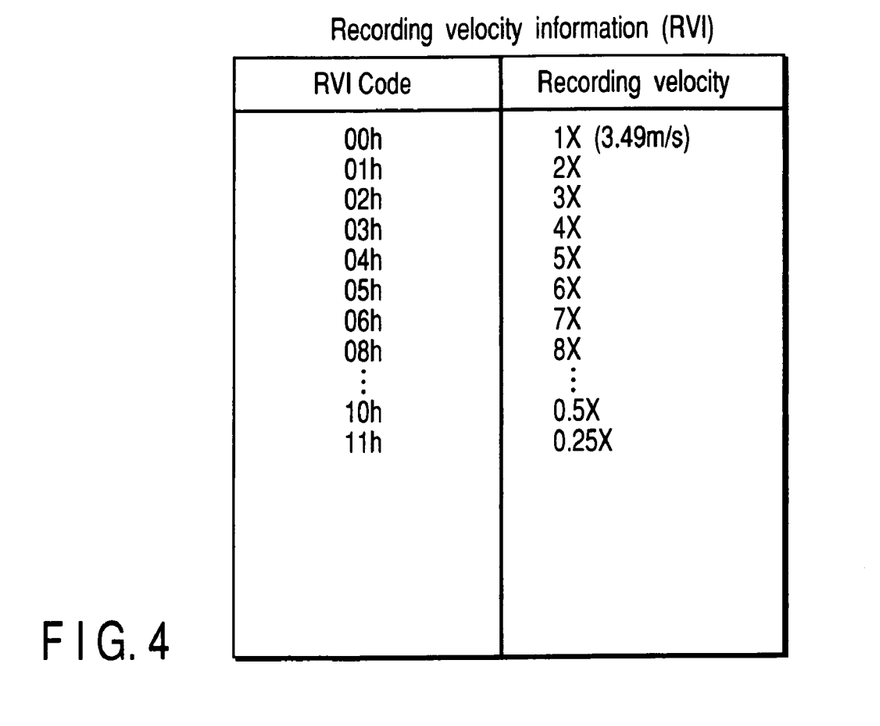
FIG. 4 is a view showing the RVI information table of the optical disc according to the present invention.
Figure 5:
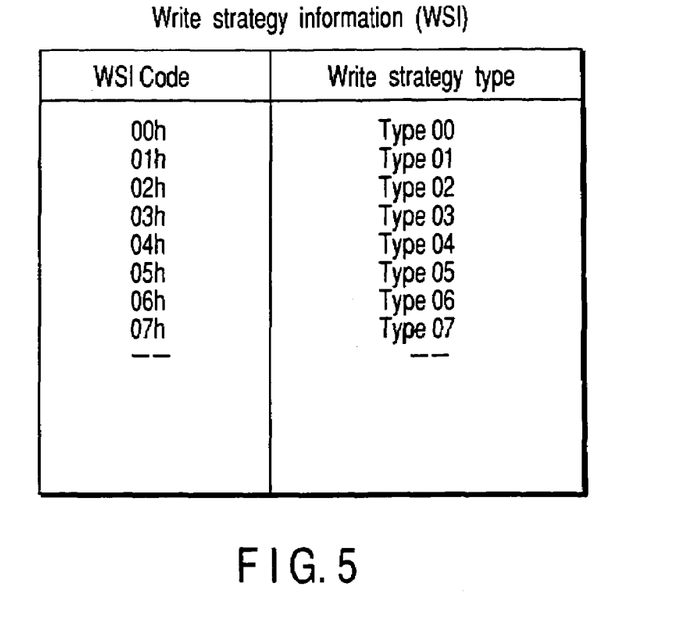
FIG. 5 is a view showing the write strategy information table of the optical disc according to the present invention.
Figure 6A:
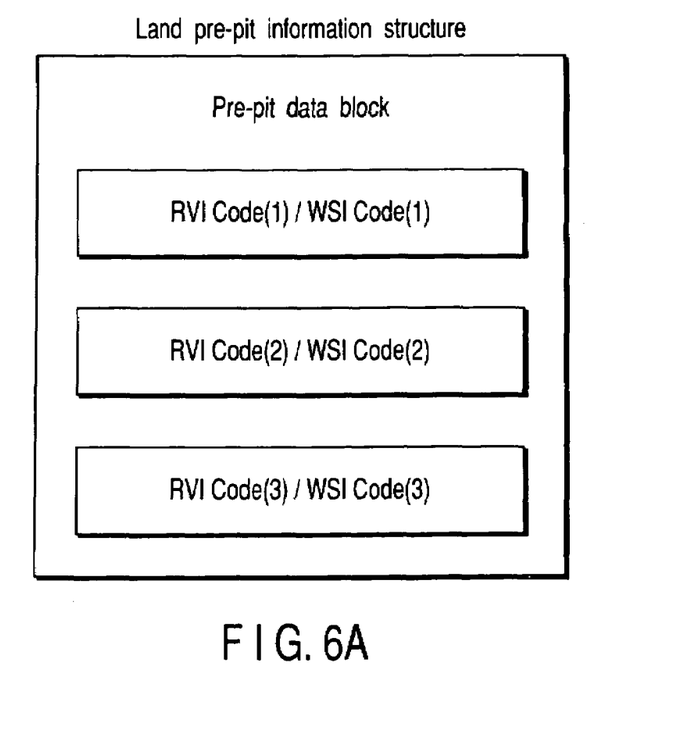
FIG. 6A is a view showing the structure of land pre-pit information of the optical disc according to the present invention.
Figure 6B:
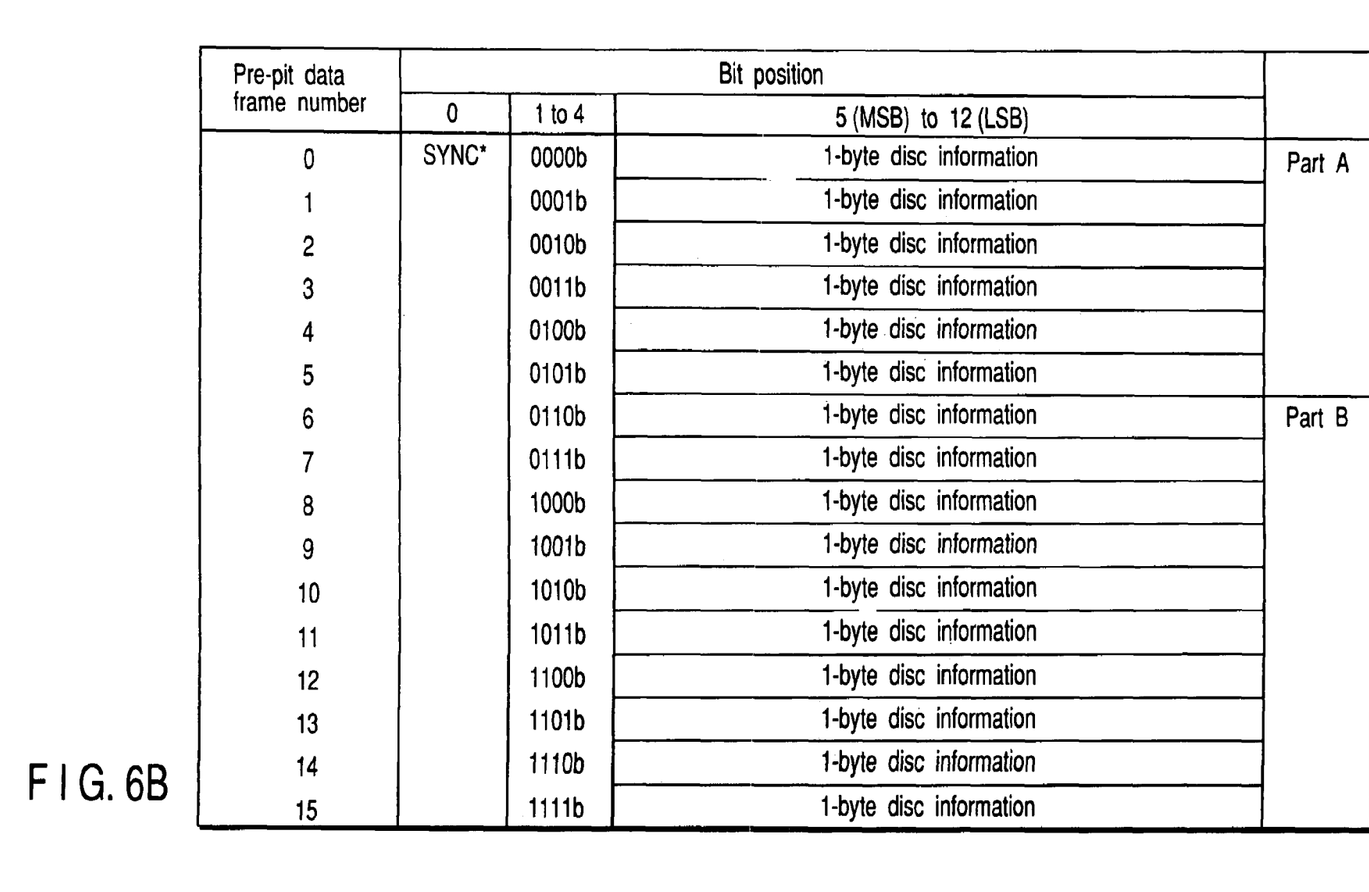
FIG. 6B is a view showing in detail the structure of land pre-pit information of the optical disc according to the present invention.

The optical disc of the first embodiment will be described below with reference to the accompanying drawing. FIG. 1A is a view showing the structure of data recorded in groove tracks of an optical disc (DVD-R or DVD-RW). FIG. 1B is a view showing the structure of data recorded in groove tracks of an optical disc (DVD-RAM). FIG. 2 is a view for explaining land pre-pits. FIG. 3 is a view showing the structure of land pre-pit information. FIG. 4 is a view showing an RVI information table. FIG. 5 is a view showing a write strategy information table. FIGS. 6A and 6B are views showing the structure of land pre-pit information.

Referring to these views, an optical disc for recording/reproduction has grooves which are spirally formed from the inner periphery. Tracks formed by the grooves are called groove tracks. Tracks between the grooves are called land tracks. To record an information signal on this optical disc, recording marks are formed on the grooves using a laser beam, thereby writing the information signal.

In this method, the reflectance/absorbance of a photosensitive organic substance serving as a recording medium is changed using heat by a laser beam, or a recording medium is phase-changed (into a crystalline or amorphous state) by liquefying, thereby forming marks to record a signal.

Representative optical disc products are a CD-R, CD-RW, DVD-R, DVD-RW, and DVD-RAM. To obtain a predetermined recording density, recording tracks on such an optical disc are generally formed by wobbling grooves. In a recording mode, a wobble signal is detected, a PLL circuit synchronous with the wobble signal is operated, and the output from the PLL circuit is frequency-multiplied to generate a write clock.

In an initialization mode to a CD-R or CD-RW, a wobble signal is converted into a carrier wave, position information (address signal) and the like are modulated by bi-phase modulation, and physical addresses (IDs or the like) are recorded by a light beam corresponding to the resultant modulated signal.

Generally, recording/reproduction of a DVD-R or DVD-RW is done at a linear velocity of 3.49 m/s. The present invention provides an optical disc which stores in advance a plurality of sets of recording velocity information (RVI) that allow recording at a high linear velocity twice to fourfold the conventional linear velocity and disc recommended write strategy information (WSI) corresponding to the recording velocity information. Even when the recording linear velocity is changeable, the conventional specified recording density is maintained to keep the disc compatibility. That is, the recording capacity of a disc does not change.

When recording is performed at a higher linear velocity, the data transfer rate increases. A drive records information at a high recording frequency corresponding to that data transfer rate. Since the recording capacity of the disc does not change, the recording time shortens. Conversely, when recording is performed at a lower linear velocity, the data transfer rate decreases. The drive records information at a low recording frequency corresponding to that data transfer rate. Since the recording capacity of the disc does not change, the recording time is prolonged. That is, for recording, e.g., a video, a long video can be recorded although the image quality relatively degrades.

Hence, in correspondence with a plurality of recording linear velocities detected from an optical disc, the data transfer rate in the reproduction mode can be made higher or lower than the data transfer rate defined for the standard linear velocity in accordance with the data transfer rate in the data recording mode.

The data transfer rate in the data reproduction mode is recorded in the control data area of the lead-in of a disc. When the linear velocity in the recording mode is changeable, data can be transferred at a rate higher or lower than the standard data transfer rate.

For example, assume that data is recorded at a fourfold linear velocity and fourfold data transfer rate in the recording mode. If this data is reproduced at the fourfold linear velocity in the reproduction mode, a fourfold data transfer rate is possible. This optical disc can cope with an application that requires the fourfold data transfer rate for data recording/reproduction. For example, a BS digital broadcast is done at a transfer rate of 20 Mbps. This broadcast cannot be directly recorded on a DVD-R using a transfer rate of 10 Mbps. However, when the linear velocity is doubled, the information can be recorded at a transfer rate of 20 Mbps.

As another example, when data is recorded at a ¼ linear velocity and ¼ data transfer rate, the power consumption of a spindle motor for rotating the disc can be reduced because the disc rotational speed decreases. In addition, drive power consumption can be reduced because the recording power of a recording laser decreases. This prolongs the battery drive time when a drive is mounted in a mobile device such as a notebook model personal computer.

The embodiment of the present invention is not limited to the case wherein the standard linear velocity is the ×1 read rate, i.e., 3.49 m/s. When the standard velocity is a ×4 read rate, recording/reproduction can be executed at a ×6, ×8, ×12, or ×16 read rate. In addition, when the standard velocity is a ×8 read rate, recording may be executed at a ×4 or ×2 read rate, i.e., at a read rate lower than the standard velocity.

In the present invention, a plurality of sets of recording velocity information (RVI) that define recording velocities with which a disc copes and disc recommended write strategy information (WSI) corresponding to the recording velocity information are recorded in advance on that disc. For example, in a DVD-R or DVD-RW, a specified linear velocity in the recording/reproduction mode is designated in a land pre-pit (LPP) as physical information of the disc. In the present invention, a write strategy corresponding to the maximum linear velocity of the disc in the recording/reproduction mode is recorded using a land pre-pit.

FIG. 1A shows the structure of data recorded in groove tracks of a disc (DVD-R or DVD-RW). The disc has, from its inner periphery, a recording power calibration area (OPC) 11, recording management area (RMD) 12, lead-in area 13, user data area 14, and lead-out area 15. Part of the lead-in area 13 is formed from an embossed or pre-recorded area 16.

FIG. 1B shows the structure of data recorded in groove tracks of a disc (DVD-RAM). The disc has, from its inner periphery, a lead-in area 23 having an embossed area or pre-pit 21 and recording management area (RMD) 22 serving as a rewritable area, and the user data area 14.

A data signal is recorded in a groove track. As shown in FIG. 2, land pre-pits 17 are formed in lands in advance for addresses in the recording mode. Land pre-pit information formed by the land pre-pit 17 has the structure shown in FIG. 3. As shown in FIG. 3, address information 18 and disc information 19 can be recorded as land pre-pit information. In the present invention, a plurality of sets of recording velocity information (RVI) and corresponding recommended write strategy information (WSI) 20 are newly recorded in the disc information 19.

A DVD-RAM has no land pre-pits. Hence, recording velocity information (RVI) and corresponding recommended write strategy information (WSI) are recorded in the embossed or pre-bit area 21 or rewritable area (RMD) 22, as will be described in the second embodiment.

FIG. 4 shows the table of recording velocity information RVI of the present invention. This RVI table is recorded in, e.g., the ROM of an optical disc recording/reproducing apparatus in advance. One RVI code is recorded using the land pre-pit 17 of the disc as the RVI information 20 in the disc information 19. An RVI code is code information that defines the possible recording/reproduction velocity of a disc. For example, a disc on which an RVI code "02h" is recorded is capable of recording at a linear velocity threefold the conventional linear velocity. An RVI code "11h" indicates that recording at a 0.25-fold linear velocity is possible. The RVI need not always be code information and may be a defined flag or numerical data.

High linear velocity recording is a recording mode effective for applications that require higher data transfer rates, such as shortening the data backup time or recording a digital data broadcast.

The recording velocity information RVI can define not only the possibility of a high linear velocity but also the possibility of a low linear velocity. Low linear velocity recording is effective when long-time recording should be done using a lower data transfer rate than the standard data transfer rate. This recording mode is useful for recording at a low data transfer rate to record, e.g., proceedings of a meeting, a data communication log, or a monitor log.

FIG. 5 shows an example of recommended write strategy information of the disc corresponding to the recording velocity information RVI (write strategy information WSI corresponding to a linear velocity). The write strategy information WSI can be recorded as the physical information of the disc.

Pieces of write strategy information WSI are selected in accordance with recording velocity information RVI. Pieces of optimum write strategy information WSI are recorded on the disc in advance. Write strategy types corresponding to the write strategies WSI are decided in advance as shown in the write strategy information table.

As described above, in the optical disc of the present invention, recording velocities which are different from the initial specified recording linear velocity and with which the disc copes are recorded on the disc itself as the recording velocity information RVI in advance. In addition, disc recommended write strategy information for each recording linear velocity is also recorded on the disc itself in advance. For, e.g., a DVD-R or DVD-RW, physical information of the disc is recorded in a land pre-pit. Hence, these pieces of information are recorded in land pre-pits.

FIG. 6A clearly shows the information. As is apparent from FIG. 6A, a plurality of sets of recording velocity information RVI and write strategy information WSI are newly embedded in land pre-pit data information.

FIG. 6B is a view for explaining the land pre-pit data information in more detail. The plurality of sets of recording velocity information RVI such as highest velocity information or usable velocity information and write strategy information WSI corresponding to the recording velocity information RVI can be recorded as some pre-pit data indicated by pre-pit blocks shown in FIG. 6B.

In the first embodiment of the present invention, sets of recording velocity information RVI and write strategy information WSI are recorded in, e.g., the land pre-pit area of an optical disc such as a DVD-R or DVD-RW. With this arrangement, even when a user side or optical disc recording apparatus is not ready, the write strategy in the optical disc recording apparatus can easily and reliably be decided.

Second Embodiment

In the second embodiment, recording velocity information RVI and write strategy information WSI are recorded not only in a land pre-pit area but in another area such as an embossed area or pre-recorded area (16 in FIG. 1A, or 21 or 22 in FIG. 1B).

More specifically, recording velocity information RVI and write strategy information WSI are recorded in an embossed area or pre-recorded area 16 of a DVD-R or DVD-RW, or in an embossed area or pre-pit area 21 or recording management area 22 of a DVD-RAM.

When the location of recording velocity information RVI and write strategy information WSI is not limited to a land pre-pit, the present invention can be applied not only to a land pre-pit but also to another area or a disc of another type.

Third Embodiment

Figure 7:
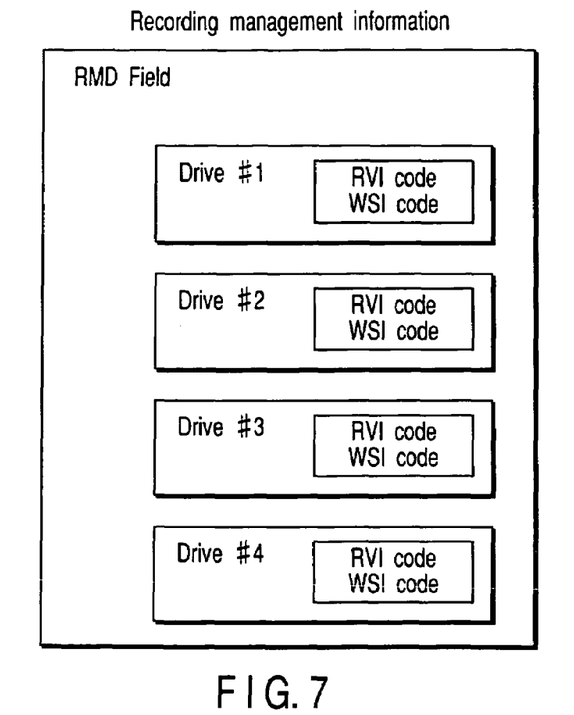
FIG. 7 is a view showing the structure of recording management information of an optical disc according to the present invention.

In the third embodiment, an optical disc stores recording velocity information RVI and write strategy information WSI, which are used for recording, in, e.g., recording management data RMD. FIG. 7 is a view showing the structure of the recording management information RMD of an optical disc according to the present invention.

In a conventional DVD-R or DVD-RW, various kinds of information of an optical disc recording/reproducing apparatus, which are used to record data by a DVD-R or DVD-RW recording/reproducing apparatus, are recorded as recording management data (RMD). However, recording velocity information RVI as a recording linear velocity and write strategy information WSI corresponding to the recording velocity information RVI are not recorded or managed in the recording management data RMD.

In the third embodiment, a recording linear velocity used in an optical disc recording/reproducing apparatus is recorded in recording management data RMD as recording velocity information RVI, and a write strategy actually used in correspondence with the recording linear velocity is recorded in the recording management data RMD as write strategy information WSI in correspondence with the optical disc recording/reproducing apparatus, as shown in FIG. 7.

With this arrangement, even when low velocity recording areas and high velocity recording areas are present in a single optical disc in a mixed manner, the write strategy and recording power can easily be reproduced. Hence, recording/reproduction processing can be executed smoothly and reliably.

For the write strategy information WSI, a table may be prepared in advance in correspondence with the velocities of the recording velocity information RVI. Strategy information actually used may be written in the column of a corresponding velocity in the table. However, the present invention is not limited to this form.

Fourth Embodiment

Figure 9:
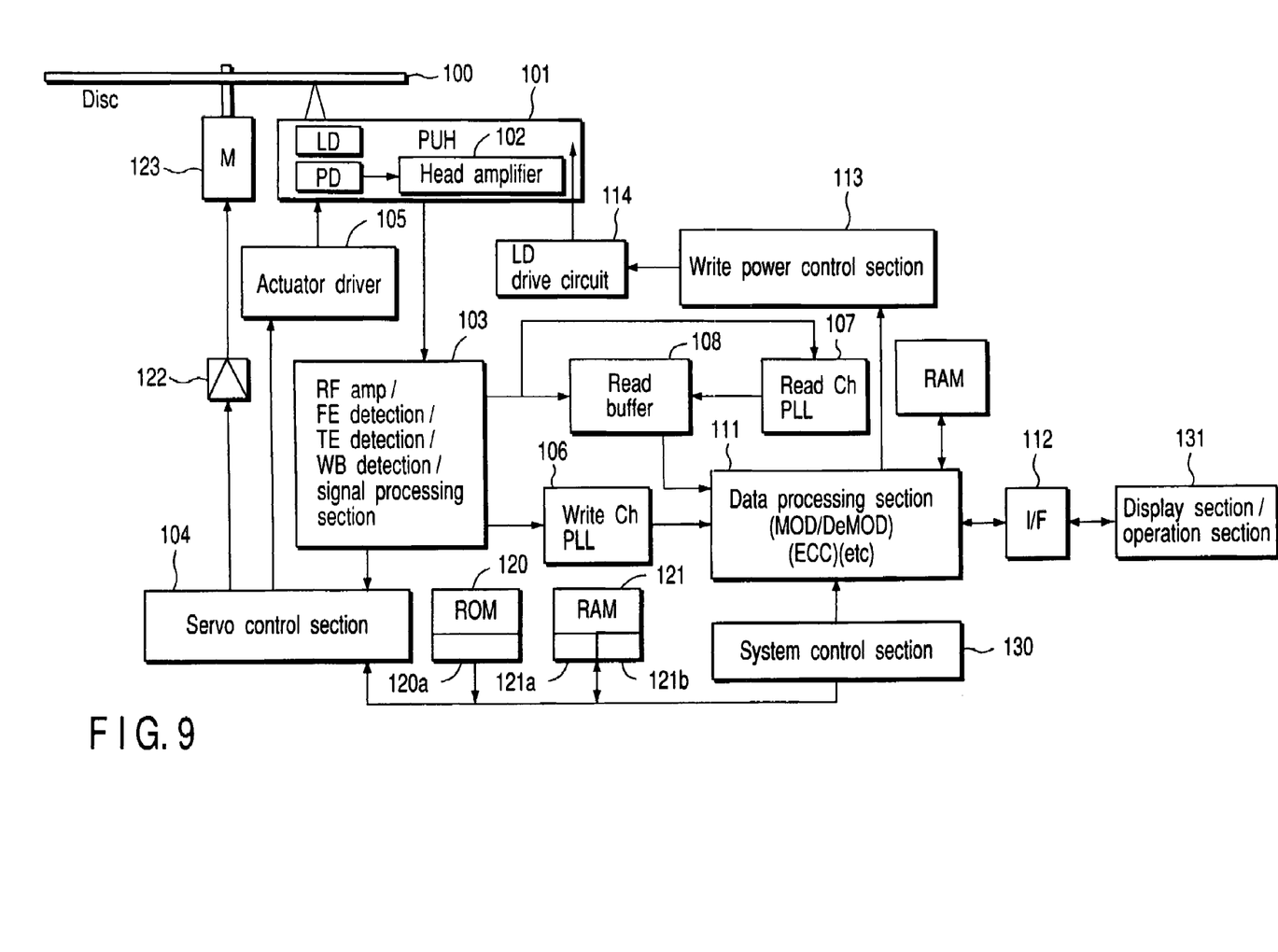
FIG. 9 is a block diagram of an optical disc recording/reproducing apparatus which uses the optical disc according to the present invention.
Figure 10A:
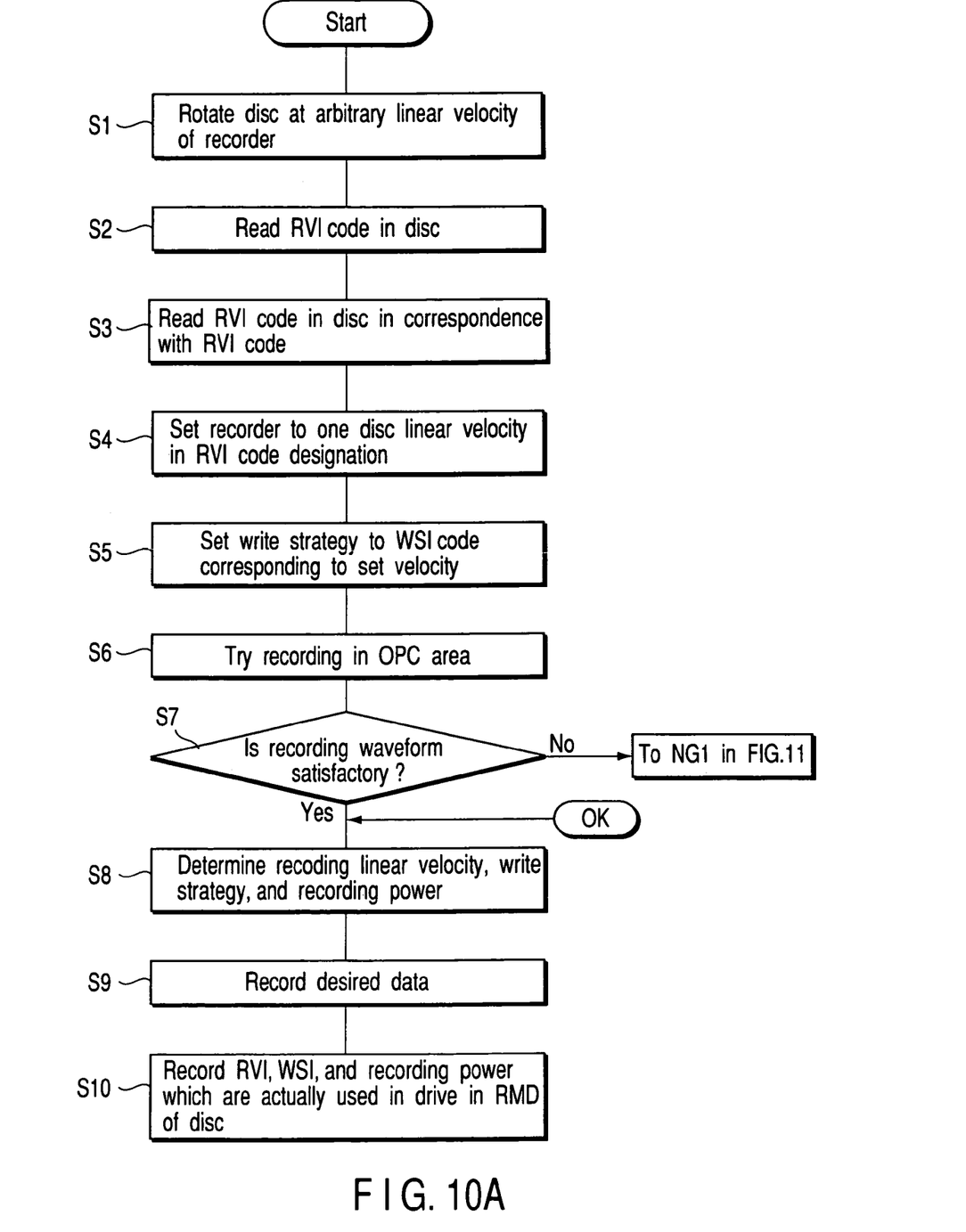
FIGS. 10A and 10B are flow charts for explaining recording processing using write strategy information according to the present invention.
Figure 10B:
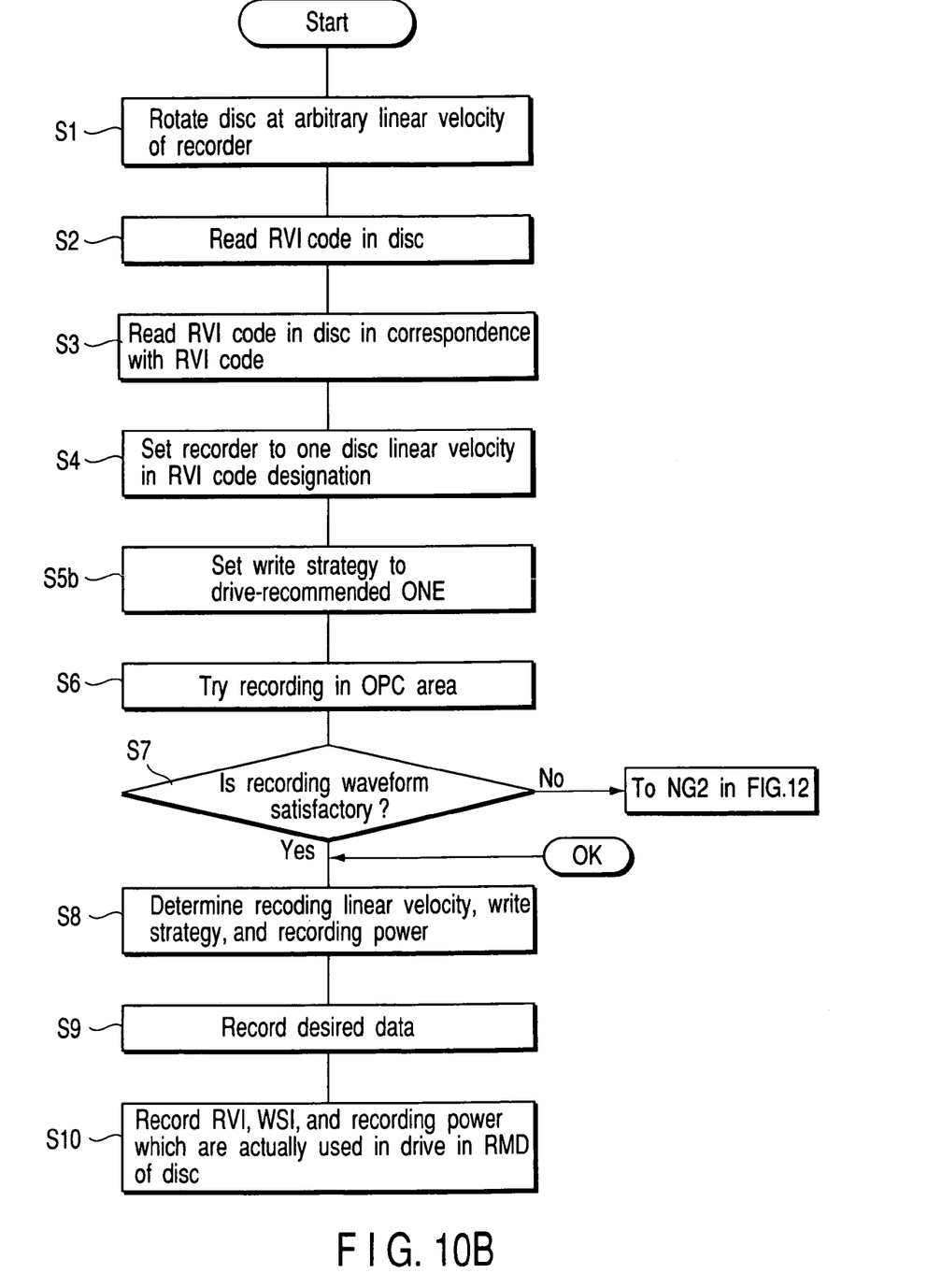

The fourth embodiment shows an optical disc recording/reproducing apparatus for executing recording processing for the above-described optical disc. FIG. 9 is a block diagram of an optical disc recording/reproducing apparatus which uses the optical disc according to the present invention. FIGS. 10A and 10B are flow charts for explaining recording processing using write strategy information according to the present invention.

Referring to FIG. 9, in the optical disc recording/reproducing apparatus using the optical disc of the present invention, a system control section 130 executes predetermined operation by using a RAM 121 as a work area in accordance with a program which includes the present invention and is recorded in a ROM 120. The ROM 120 includes the table of recording velocity information RVI shown in FIG. 4. A disc 100 is irradiated with light output from an optical pickup 101. Reflected light from the disc 100 is converted into an electrical signal by a head amplifier 102. The electrical signal is input to a signal processing section 103. The signal processing section 103 includes an RF amplifier, a focus error (FE) detecting section and tracking error (TE) detecting section which serve as a servo error detecting section, and a wobble (WB) signal detecting section.

A focus error signal or tracking error signal as a servo error signal is sent to a servo control section 104 and undergoes optimum equalizer processing. The servo error signal controls the objective lens or pickup feed motor of the optical pickup 101 through an actuator driver 105. With this processing, a desired track is stably irradiated with the laser beam. In addition, a spindle motor 123 is controlled to a predetermined speed through a motor drive circuit 122.

In synchronism with this operation, a wobble signal is detected. A write channel PLL circuit 106 generates a write clock. The clock generated by the PLL circuit 106 is sometimes used in a read mode to quickly lock a read clock generated by a read channel PLL circuit 107. The clock from the circuit 107 is supplied to a read buffer 108.

In data write operation, a data processing section 111 adds an error-detecting code (EDC) or ID to data sent through an interface 112 using the write clock generated by the write channel circuit 106, executes data scrambling for stable servo, adds an error-correcting code (ECC), and adds a sync signal. In addition, the data processing section 111 modulates the signal other than the sync signal, sends the signal to a write power control section 113, and writes the signal on the optical disc through a laser diode drive circuit 114 using a write strategy optimum for the optical disc.

In a read mode, an RF signal read from the head amplifier 102 of the optical pickup 101 is sent to the read buffer 108 and PLL circuit 107 through an optimum equalizer. Channel data is read to the read buffer 108 by the read clock generated by the PLL circuit 107. The read data is synchronized by the data processing section 111, and symbol data is read. After that, error correction and descrambling are executed. Then, the data is transferred to the outside through the interface 112.

(Recording Processing of Present Invention)

Recording processing of the present invention using recording velocity information RVI and write strategy information WSI stored in an optical disc will be described below in detail with reference to the flow charts shown in FIGS. 10A and 10B.

When the disc is loaded in the recording apparatus, the system control section 130 rotates the disc at an arbitrary linear velocity of the recording apparatus through the servo control section 104 (step S1). Reproduction is preferably done at the highest recording linear velocity possible in the recording apparatus.

The system control section 130 reads from land pre-pits RVI codes recorded on the disc through the data processing section 111 and stores the RVI codes in a memory 121a (step S2). The system control section 130 detects disc linear velocities corresponding to the read RVI codes by looking up the recording velocity information table shown in FIG. 4. In addition, selectable data transfer rates are decided in correspondence with the recording linear velocities of the disc. These selectable data transfer rates are displayed on a display section 131 under the control of the system control section 130. The user is promoted to select a data transfer rate. When an operation signal corresponding to user's operation is supplied through the operation section 131, a data transfer rate designated by the operation signal is decided and a recording linear velocity corresponding to the data transfer rate is selected. Accordingly, write strategy information WSI code is reproduced from the disc (step S3). A corresponding write strategy in the reproduced write strategy information (FIG. 5) is selected. The rotational speed of the spindle motor 123 is controlled in accordance with the recording linear velocity and write strategy information, and the disc is rotated at that recording linear velocity (steps S4 and S5).

Next, the system control section 130 tries recording in the trial recording area (OPC area) of the disc at the linear velocity designated by the recording velocity information RVI in accordance with the write strategy information (step S6). At this time, the system control section 130 arbitrarily changes the recording power through the write power control section 113 to obtain a recording power with an optimum recording waveform. The signal waveform of the reproduced signal of the trial-recorded information is detected. If the signal quality is satisfactory (step S7), the recording linear velocity, write strategy, and recording power are decided (step S8). The system control section 130 records data at the decided recording linear velocity and recording power (step S9). The system control section 130 stores the recording linear velocity and recording power at that time in a memory 121b.

After data recording, the system control section 130 reads out the RVI and recording power actually used in the recording apparatus from the memory 121b and records them in the recording management area RMD of the disc 100 (step S10).

As shown in FIG. 10B, in step S5b, a drive-recommended write strategy may be set from the beginning. In this case, no WSI code corresponding to the set velocity is designated, unlike FIG. 10A.

In the optical disc recording/reproducing apparatus according to the present invention, as described above, pieces of recording velocity information and write strategies stored in the optical disc are detected and referred to, and a plurality of data transfer rates are given to the user as choices. A recording linear velocity and write strategy corresponding to the data transfer rate selected by the user are selected and decided, and recording/reproduction processing is executed on the basis of these pieces of information. Hence, even when the optical disc recording/reproducing apparatus or user side cannot prepare an optimum write strategy, optimum recording conditions are realized by the set of recording velocity information and write strategy information stored in the optical disc, thereby executing stable recording/reproduction processing at a ×2 read rate, ×3 read rate, or the like.

Even when the recording linear velocity is changeable, the conventional specified recording density of the disc is maintained to keep the disc compatibility. For this reason, the recording capacity of the disc does not change. However, when recording is performed at a higher linear velocity, the data transfer rate increases. A drive records information at a high recording frequency corresponding to that data transfer rate. Since the recording capacity of the disc does not change, the recording time shortens. Conversely, when recording is performed at a lower linear velocity, the data transfer rate decreases. The drive records information at a low recording frequency corresponding to that data transfer rate. Since the recording capacity of the disc does not change, the recording time is prolonged.

Hence, in the reproduction mode, the data transfer rate can be made higher or lower than that defined by the standard linear velocity in accordance with the data transfer rate in the data recording mode. The data transfer rate can be changed in accordance with the type of information to be recorded. More specifically, a BS digital broadcast or the like, which should have priority for the image quality, can be recorded by increasing the data transfer rate. For video information which should have priority for recording time over the image quality, long-time recording can be performed at a data transfer rate lower than the standard data transfer rate.

Fifth Embodiment

Figure 8:
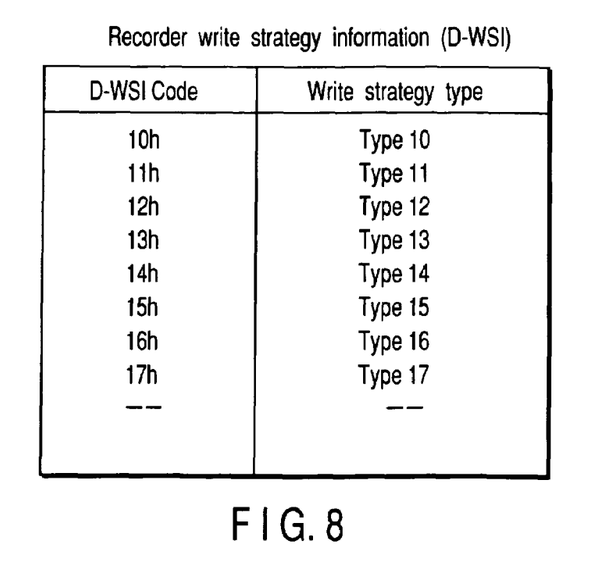
FIG. 8 is a view showing write strategy information corresponding to an optical disc recording/reproducing apparatus according to the present invention.
Figure 11:
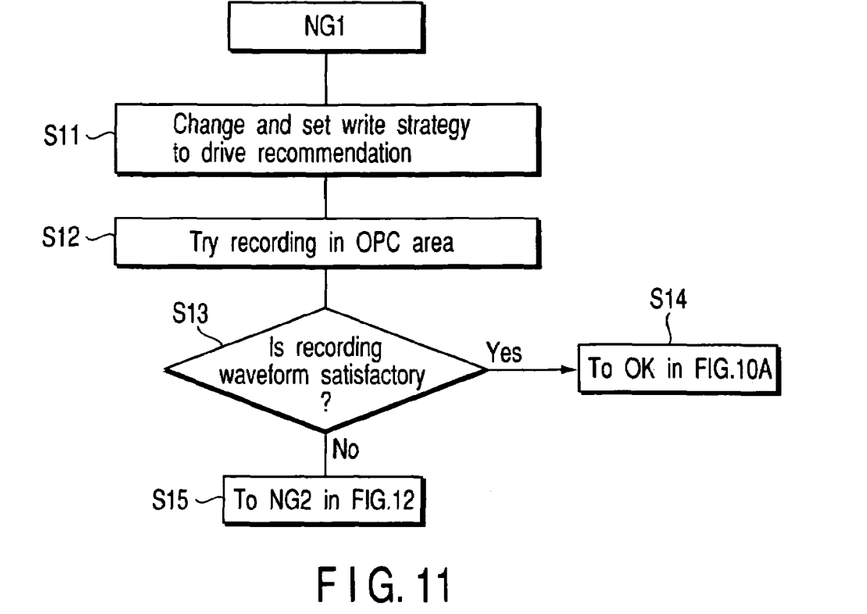
FIG. 11 is a flow chart for explaining recording processing using the write strategy information according to the present invention.
Figure 12:
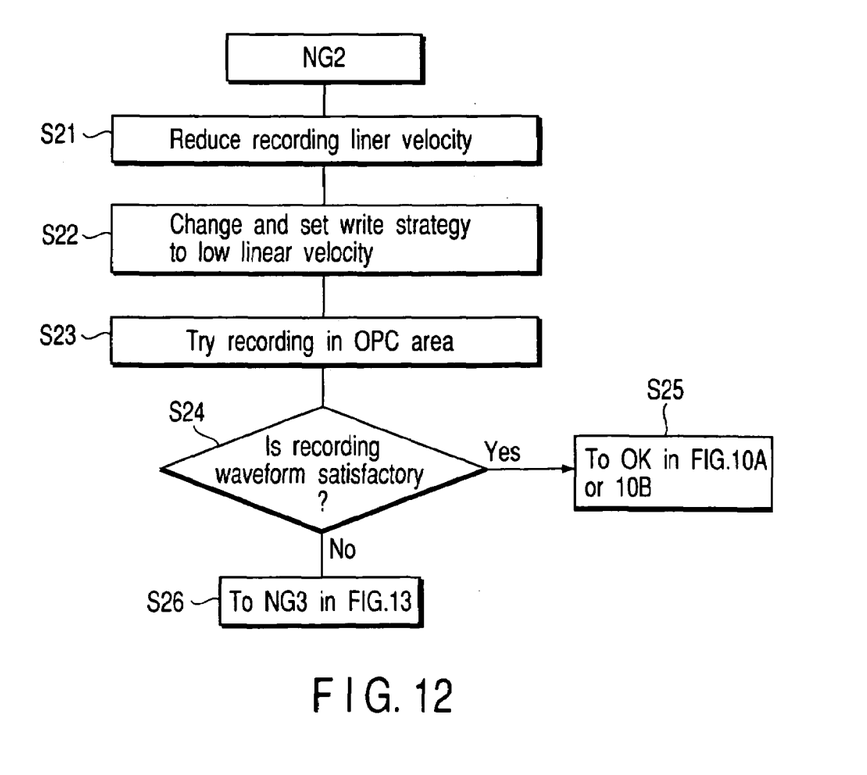
FIG. 12 is a flow chart for explaining recording processing using the write strategy information according to the present invention.
Figure 13:
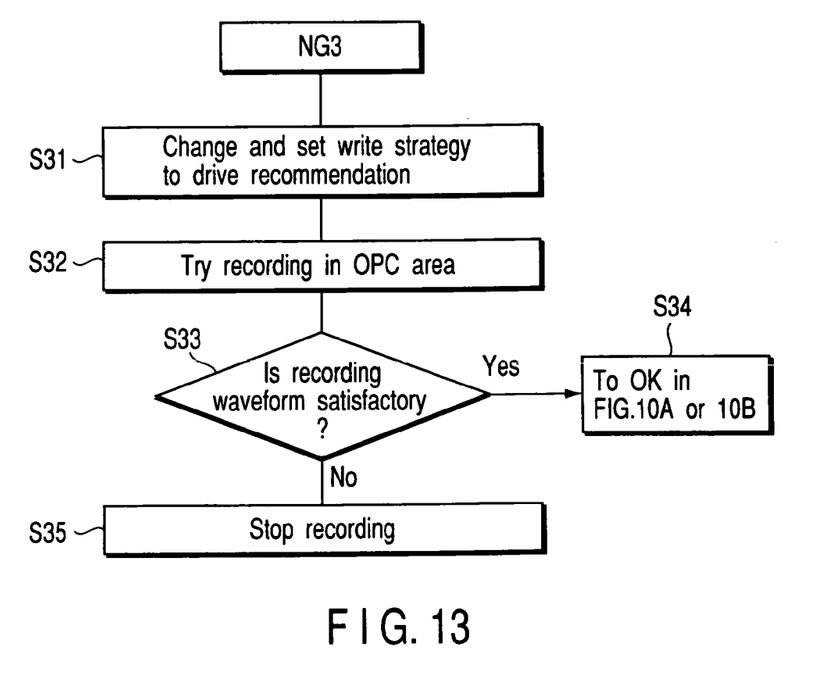
FIG. 13 is a flow chart for explaining recording processing using the write strategy information according to the present invention.

The fifth embodiment shows measures of an optical disc recording/reproducing apparatus when recording processing is executed on the basis of recording velocity information (RVI) and corresponding write strategy information (WSI) stored in an optical disc, and no desired recording waveform is obtained. FIG. 8 is a view showing write strategy information corresponding to an optical disc recording/reproducing apparatus. FIGS. 11 to 13 are flow charts for explaining processing when no desired recording waveform is obtained.

(Processing from NG1)

If no satisfactory recording waveform is obtained in step S7 of the above-described flow chart shown in FIG. 10A, the linear velocity in the recording mode is kept at that of the first recording velocity information RVI, though the write strategy is changed to a write strategy D-WSI, shown in FIG. 8, unique to the optical disc recording apparatus instead of using the recommended write strategy information WSI recorded on the optical disc in advance, in accordance with the flow chart of FIG. 11 (S11). This write strategy is stored in a ROM 120 or RAM 121 of the optical disc recording apparatus. On the basis of the write strategy D-WSI recommended by the optical disc recording apparatus, trial recording is executed in the OPC area at the recording linear velocity given by the recording velocity information RVI first (S12). For the recording power, recording is performed on the basis of the drive-recommended write strategy while changing the power level, and an optimum recording power is decided.

The data of this trial recording is detected and confirmed (S13). If the recording waveform is satisfactory, data recording processing is executed on the basis of the linear velocity of the recording velocity information RVI, the drive-recommended write strategy D-WSI, and the recording power (S15).

After that, the drive-recommended write strategy D-WSI is stored in a memory 4 such as the RAM 121, and the recording power is stored in a memory 5 (S9).

After data recording, code information of the linear velocity of RVI (memory 1), drive-recommended write strategy D-WSI (memory 4), and recording power (memory 5) which are used in the recording mode is recorded in a recording management area RMD (S10).

(Processing from NG2)

If no satisfactory recording waveform is obtained in step S13, or if no satisfactory recording waveform is obtained in step S7 of the above-described flow chart shown in FIG. 10B, the linear velocity is changed to a linear velocity RVI(2) lower than the linear velocity of the first recording velocity information RVI(1) by one step in accordance with the flow chart of FIG. 12 (S21). The write strategy is also set to a disc-recommended write strategy WSI(2) corresponding to RVI(2) (S22). Trial recording is executed in the OPC area on the basis of the recording linear velocity RVI(2) and write strategy WSI(2) (S23). If the resultant recording waveform is satisfactory (S24), data is recorded under these recording conditions (S26). After recording, the codes of RVI(2) and WSI(2) are recorded in a recording management area RMD.

(Processing from NG3)

If no satisfactory recording waveform is obtained in step S24, the linear velocity in the recording mode is kept at RVI(2), though the write strategy is changed to a write strategy D-WSI(2) unique to the optical disc recording apparatus instead of using the recommended write strategy WSI(2) recorded on the disc in advance, in accordance with the flow chart of FIG. 13 (S31).

On the basis of the write strategy D-WSI(2) recommended by the optical disc recording apparatus, trial recording is executed in the OPC area at the linear velocity RVI(2) (S32). For the recording power, recording is performed on the basis of the drive-recommended write strategy D-WSI(2) while changing the power level, and an optimum recording power is decided.

If the recording waveform is satisfactory, data is recorded on the basis of the linear velocity of the linear velocity of RVI(2), the drive-recommended write strategy D-WSI(2), and the recording power (S35). After data recording, code information of the linear velocity of RVI(2), drive-recommended write strategy D-WSI(2), and recording power which are used in the recording mode is recorded in a recording management area RMD. However, if no satisfactory recording waveform is obtained in step S33, recording is stopped (S34).

(Another Method)

Even when no satisfactory recording waveform is obtained in step S33, the operation shown in FIG. 12 (the recording linear velocity is reduced) and the operation shown in FIG. 13 (the write strategy is changed to a drive-recommended write strategy) are repeated until the lowest linear velocity of recording velocity information RVI recorded on the disc in advance. If no satisfactory recording waveform is obtained even with these processes, recording processing may be stopped. With this method, instead of immediately stopping recording processing, recording processing can be executed in a form that meets the user's wishes as much as possible.

The present invention can be practiced by those skilled in the art in accordance with the above-described embodiments. It will be understood by those skilled in the art that various changes and modifications can be made, and the principles in a broad sense disclosed above can be applied to various embodiments even without any inventive ability. The present invention is not limited to the above-described embodiments and will cover a wide range as long as it is not contradictory to the disclosed principles and new features.

As described above, an RVI need not always be code information but may be a defined flag or numerical data.

As has been described above in detail, according to the present invention, a plurality of sets of recording velocity information RVI representing the possible recording linear velocities of an optical disc and write strategy information WSI corresponding to the recording velocity information RVI are recorded in the storage area of the disc. In recording processing at a ×2 read rate, ×3 read rate, or the like, an optimum write strategy can be provided without preparing any write strategy in the optical disc recording/reproducing apparatus or on the user side. Hence, an optical disc capable of stably executing recording/reproduction processing at various read rates can be provided.

In addition, according to the present invention, an optical disc recording apparatus and optical disc reproducing apparatus capable of giving an optimum write strategy using the optical disc and an optical disc recording/reproducing method for these apparatuses can be provided.

What is claimed is:

1. A recording optical disc wherein recording velocity information code used for recording in a recording apparatus and write strategy information code used in correspondence with the recording velocity information code are stored in a management area in correspondence with the recording apparatus.

2. A recording optical disc according to claim 1, wherein the recording velocity information code and the write strategy information code are defined in a code table information stored in a memory area of an optical disc recording apparatus.

3. An optical disc recoding apparatus comprising:
   detection means for rotating a recording optical disc wherein recording velocity information code used for recording in a recording apparatus and write strategy information code used in correspondence with the recording velocity information code are stored in a management area in correspondence with the recording apparatus, at a predetermined rotational speed, irradiating the optical disc with a laser, and detecting the recording velocity information code and the write strategy information code;

decision means for deciding recording velocity information on the basis of the recording velocity information code detected by said detection means and deciding the write strategy information corresponding to the recording velocity information code as a write strategy to be used, referring to a code table stored in memory area; and recording means for generating the laser in accordance with information to be recorded and irradiating a storage area on the optical disc with the laser to record the recording information on the basis of the recording linear velocity and write strategy decided by said decision means.

4. An optical disc recoding method comprising:
   rotating a recording optical disc wherein recording velocity information code used for recording in a recording apparatus and write strategy information code used in correspondence with the recording velocity information code are stored in a management area in correspondence with the recording apparatus, at a predetermined rotational speed, irradiating the optical disc with a laser, and detecting recording velocity information code and write strategy information code;

deciding recording velocity information on the basis of the detected recording velocity information code and deciding the write strategy information corresponding to the recording velocity information code as a write strategy to be used, referring to a code table stored in a memory area, and generating the laser in accordance with information to be recorded and irradiating a storage area on the optical disc with the laser to record the recording information on the basis of the decided recording linear velocity and write strategy.

* * * * *